(12) United States Patent
Wang et al.

(10) Patent No.: US 8,228,859 B2
(45) Date of Patent: Jul. 24, 2012

(54) METHOD FOR INDUSTRIAL WIRELESS COMMUNICATION BASED ON SELF-ADAPTIVE CHANNEL HOPPING WITHIN THE TIMESLOT

(75) Inventors: Ping Wang, Chongqing (CN); Quan Wang, Chongqing (CN)

(73) Assignee: Chongqing University of Posts and Telecommunications, Chongqing (CN)

( * ) Notice: Subject to any disclaimer, the term of this patent is extended or adjusted under 35 U.S.C. 154(b) by 426 days.

(21) Appl. No.: 12/554,064

(22) Filed: Sep. 4, 2009

(65) Prior Publication Data

US 2010/0061362 A1 Mar. 11, 2010

(30) Foreign Application Priority Data

Sep. 11, 2008 (CN) .......................... 2008 1 0070289

(51) Int. Cl.
*H04W 4/00* (2009.01)
*H04B 7/212* (2006.01)
(52) U.S. Cl. ...................... 370/329; 370/338; 370/341
(58) Field of Classification Search .................. None
See application file for complete search history.

(56) References Cited

U.S. PATENT DOCUMENTS

| | | | |
|---|---|---|---|
| 5,504,750 A | 4/1996 | Fulghum et al. | |
| 5,506,863 A | 4/1996 | Meidan et al. | |
| 6,466,800 B1 | 10/2002 | Sydon et al. | |
| 6,751,250 B2 | 6/2004 | Kirke et al. | |
| 240,835 A1 | 10/2006 | Jain et al. | |
| 7,385,999 B1 | 6/2008 | Young et al. | |
| 7,397,810 B1 | 7/2008 | Young et al. | |
| 7,403,492 B2 | 7/2008 | Zeng et al. | |
| 2003/0119534 A1 | 6/2003 | Kostic et al. | |
| 2004/0028015 A1* | 2/2004 | Fouilland et al. | 370/337 |
| 2005/0174979 A1* | 8/2005 | Chen et al. | 370/342 |
| 2006/0159003 A1* | 7/2006 | Nanda et al. | 370/203 |
| 2008/0112380 A1* | 5/2008 | Fischer | 370/338 |
| 2009/0016276 A1* | 1/2009 | Kim | 370/329 |
| 2009/0080388 A1* | 3/2009 | Rohfleisch et al. | 370/338 |

\* cited by examiner

*Primary Examiner* — Chi Pham
*Assistant Examiner* — Soon-Dong Hyun
(74) *Attorney, Agent, or Firm* — Hamre, Schumann, Mueller & Larson, P.C.

(57) ABSTRACT

The present invention is intended to protect an industrial wireless communication method based on self-adaptive channel hopping within timeslot, which belongs to industrial wireless communication technology field. Aiming to solving existing problem that wireless devices can not correspondingly self-adaptive channel hopping according to environment changing, a method for making the two communication sides self-generate and execute channel switch when the preferred channel was interfered. The sender will monitor whether the channel is idle within SWTW before sending data through mechanisms such as CCA or non-persistent CSMA. If the channel is still busy till the SWTW times out, the sender will give up sending data and implement channel switching control command by considering this communications channel as interfered. If no packets were received till the RWTW time-outs, the receiver will thinks the communication channel was interfered and automatically implement channel switching control commands. Thus, the receiver will change its backup channel into communication channel. So far, the sender and receiver all independently hop to the backup channel for new communication process after a channel switching cycle. Different time synchronization algorithm will be used in accordance with whether channel switch is carried out or not. The present invention can fully enhance the channel utilization and communication success rate, improve the reliability and real-time of data communication, reduce additional network load by means of reduced retransmission, and perfectly satisfy the requirement of industrial wireless application.

5 Claims, 2 Drawing Sheets ns of the two nodes. Each communication link includes communication channel and time slot, which means communication between two sides in the time slots is provided.

METHOD FOR INDUSTRIAL WIRELESS COMMUNICATION BASED ON SELF-ADAPTIVE CHANNEL HOPPING WITHIN THE TIMESLOT

FIELD OF THE INVENTION

The present invention relates to a communication method for industrial wireless network, which belongs to the field of wireless network communication technology. More specifically, the present invention is directed to an industrial wireless communication method based on Self-Adaptive Channel Hopping within Timeslot (SACHT) in order to achieve high reliability and low latency as well as self-adaptability.

BACKGROUND OF THE INVENTION

At present, the industrial wireless communication is known as the revolutionary technology and another hot technology besides Field bus in industrial control field. It can reduce costs and enlarge the application of automatic technology. It is not only the most potential technology in automation, but also the growth point of industrial automatic instrument in the future. Industrial wireless systems that are world widely considered (such as Wireless HART and ISA100.11a) usually adapt TDMA and FDMA technology. For example, two wireless nodes to communicate data, the system will allocate a communication link for the two nodes. Each communication link includes communication channel and time slot, which means communication between two sides in the time slots is provided. That is called hopping channel among different time slots other than hopping channel within the time slot. Frequency-hopping technology is widely used in wireless communication systems such as Global System for Mobile Communications (GSM), cellular digital packet data (CDPD) and Bluetooth (Bluetooth) to improve the stability and reliability of the system. However, the implementation of these systems are TDMA-based frequency-hopping in different time slots (channel jump), which is different from adaptive hopping channel technology.

To the best of our knowledge, there is no well-known method considering the device-adaptive channel hopping. The existing communication mechanism within time slot: The sender and the receiver will be adjusted to the given communication channel in the beginning of a time slot. The sender, before sending the data, monitors the channel through the CCA (Channel Clear Assessment). If the channel is busy, then there may be channel interference or the channel is by other nodes. If at this time the device still sends data, then the conflict will inevitably arise. It is often the case the sender will give up the communication of the current time slot. The receiver will try to receive in a period of time to wait for the sender. If it does not receive the information sent, it will also give up the communication of the current time slot. The communication between the two sides in the communication time slot is thus not a successful completion of communication. They can only wait until the next time slot. This would lead to less strong anti-interference, lower reliability, lower communication channel utilization, and the disadvantage of transmission delay.

SUMMARY OF THE INVENTION

Aimed to solve the above-mentioned existing technology shortcomings, the present invention provides a high-reliable, real-time industrial wireless communication method based on SACHT. The method has many good features such as self-adaptive, high reliability, high real-time, high efficiency, etc. Due to using of SACHT technology, the method can further enhance the reliability of wireless communications and ensure real-time and determinacy for data transmission. Therefore, it can satisfy the need of many demanding applications (such as industrial supervisory control). What's more, the present invention proposes a corresponding receiver-based time synchronization method and algorithm, which have many good features such as high efficiency, small system resource consumption, lower power consumption and so on.

Before the industrial wireless system setups, the length of Send Waiting Time Window (SWTW) and Receive Waiting Time Window (RWTW) need to be negotiated and specified. For each wireless network communication link in a industrial Wireless Network, the system manager will assign two (or more) communication channels, one is the preferred channel and the other is the backup channel. At the beginning of a given time slot, the sender and the recipient firstly select the preferred channel as communication channel. Supposed that the communication channel was interfered, the sender will detect whether the channel is idle within SWTW before sending data through mechanisms such as CCA or non-persistent CSMA. If the channel is still busy till the SWTW times out, the sender will give up sending data and implement channel switching control command considering this communications channel was interfered. Thus, then sender's backup channel will become the communication channel. The receiver will always listen on the channel during the RWTW. If no packets are received till its RWTW time-outs, the receiver will think the communication channel was interfered and also automatically implement channel switching control commands. Thus, the receiver will take its backup channel instead of preferred channel as communication channel. So far, the sender and receiver all independently hop to the backup channel for new communication process after a channel switching cycle. The sender and receiver will begin channel idle detection on the backup channel. If this channel was not interfered, the sender and receiver could communication successfully on this channel. However, if this channel was also interfered, the sender and receiver have to give up this communication slot. All this process can be completed within allocated time slot, without the need for additional time slot. Channel switching control commands generated and implemented by the both sides individually, not by the way that one party to sends switching control commands to another, thus the two sides achieve an independent channel adaptive hopping according to the dynamic environment.

In future communication time-slots, the two sides switch back to the preferred communication channel in order to use the preferred channel for communications. Thus, the previous preferred communication channel is also present preferred communication channel, and the previous backup channel is also present backup channel. Another method is: In future communications time-slots, the two sides will no longer use the previous preferred channel, but preferentially use the original backup channel as present preferred channel. Therefore, the previous preferred communication channel becomes present backup communication channel, and the previous backup channel is present preferred channel.

Sender's channel idle detection function can be implemented by many ways, such as continuous CCA or non-persistent CSMA mechanism, etc. Continuous CCA mechanism is that the sender executes continuing CCA within its SWTW. Non-persistent CSMA mechanism is that the sender executes non-continuous CCA detection by means of backoff algorithm within its SWTW. That is to say, when the sender realize the channel is busy through CSMA detection, it will turn to low-power mode from detection mode in order to reduce power consumption, and then retry CSMA detection after waiting for a while. Finally, the sender has to give up channel idle detection if its SWTW times out.

In addition, the receiver can also use address identification method to further improve the communication success efficiency and reduce power consumption. This method is specific as follows: If the receiver accepts front part of data frame within RWTW, it immediately extracts destination address from accepted data frames, and then compares the destination address with its own address. If the destination address corresponds with its own address, the receiver will continue accepting data frame. If the destination address does not correspond with its own address, the receiver will give up accepting data frame and then turn to low-power consumption mode or channel switch mode.

The present invention method also supports multi-backup channel mode. A communication slot will be allocated three or more backup channels. If the first two-channel are not available duo to interference, the two communication sides will try to communicate in the follow-up backup channels in order to further improve communication reliability and success rate. All processes should be finished within one time slot, without having to occupy the other additional slot. If one backup channel has been selected and communicated successfully, this backup channel could become the preferred channel in following time slot of this link. By means of this way, the industrial wireless communication could be not only more flexible, dynamic and adaptive anti-jamming, but also further enhanced efficiency, reliability and real-time.

In addition, the time slot length in existing industry wireless network system is usually compact in order to improve channel utilization. For successfully implement the present invention method, an accurate and efficient method of time synchronization is necessary. Therefore, the present invention proposes a receiver-based time synchronization method for SACHT. In this time synchronization method, the sender does not need to tag time-stamp when sending message. Thus, reducing power consumption is expected by the way of decreasing of data transmission quantity.

Although the invention method will occupy a backup channel for each communication link, which will reduce network capacity and bandwidth, the reliability and real-time of communication link will be certainly improved. Some typical industrial wireless applications, for example industrial wireless monitor and control network, generally require small network capacity, high reliability, high real-time, and high determinacy The present invention is particularly applicable to those kind of applications. The present invention has the following main aspects of the advantages: 1.flexibility; 2.dynamic self-adaptive; 3. enhanced channel utilization and communication success rate; 4. effectively improvement on the reliability and real-time; 5. reduction of the additional network load by reducing the retransmission of data. The present invention resolves some key questions in the industry wireless communications; it will improve performance for industrial wireless network, and will promote the practical application of industrial wireless system.

DETAILED DESCRIPTION OF THE PREFERRED EMBODIMENT

Other objects and aspects of the present invention will become apparent from the following description of the embodiments with reference to the accompanying drawings, which is set forth hereinafter.

Figure 1:
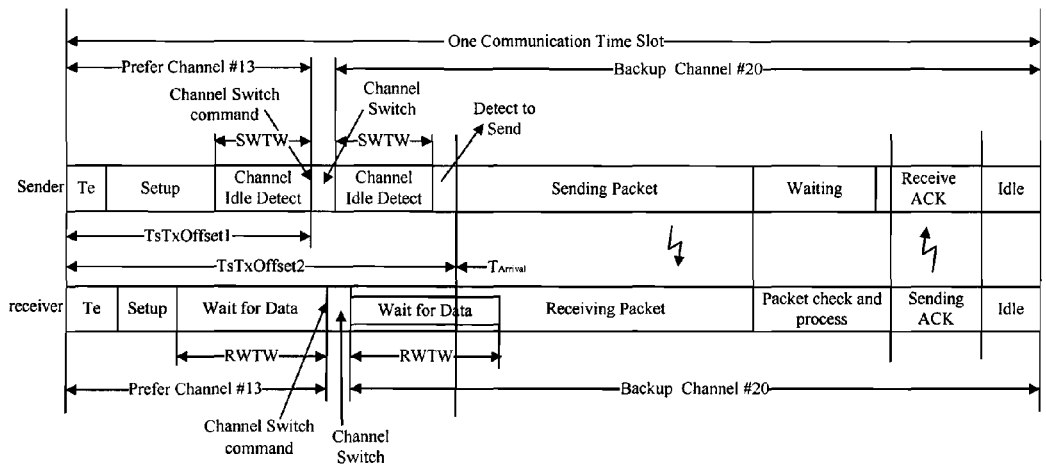
FIG. 1: Industrial Wireless Time Slot Communication Model Diagram for Self-Adaptive Channel Hopping within the Timeslot.

For each wireless network communication link in a industrial Wireless Network, the system manager will assign two (or more) communication channel, one is the preferred channel, another is the backup channel and at the same time negotiate the length of Send Waiting Time Window (SWTW) and Receive Waiting Time Window (RWTW) for data communication. As shown in FIG. 1, at the beginning of a given time slot, the sender and the receiver firstly select the preferred channel as the communication channel. Let it be supposed that the communication channel was interfered, the sender will monitor whether the channel is idle within SWTW before sending data through mechanisms such as CCA or non-persistent CSMA. If the channel is still busy till the SWTW times out, the sender will gives up sending data and implement channel switching control command by considering this communication channel to be interfered. Thus, then sender's backup channel will become the following communication channel. The receiver will always listen on the channel during the RWTW. If no packets were received till the RWTW time-outs, the receiver will thinks the communication channel was susceptible to be interfered and automatically implement channel switching control commands. Thus, the receiver will set its backup channel as the communication channel. So far, the sender and receiver all independently hop to the backup channel for the new communication process after a channel switching cycle. The sender and receiver will begin channel idle detection on the backup channel. If this channel was not interfered, the sender and receiver could communication successfully on this channel. However, if this channel was also interfered, the sender and receiver have to give up this communication slot. All this process can be completed within allocated time slot, without the need for additional time slot. Channel switching control commands generated and implemented by the communication in both sides respectively, not by the way that one party to send control commands to another, thus the two sides achieve an independent channel adaptive hopping according to dynamic environment.

IEEE 802.15.4 is a low-power, low-rate PHY/MAC standard. The Clear Channel Assessment (CCA) functions are provided in IEEE 802.15.4 physical layer. The IEEE 802.15.4 standard specified Channel 11 to 26 in the 2.4 GHz band. Two sides of communication, which are compliances with the IEEE802.15.4 specification, can select a channel as communication channel from those 16 channels. Following are the description and examples of the implementation using 2.4 GHz frequency band in IEEE 802.15.4 specification as an example, but not limited to this. The present invention can be based on a wide range of physical frequencies and standards.

FIG. 1 is shows one slot and provides an overview of transaction timing for the self-adaptive channel hopping within timeslot. All transactions occur in a slot following specific timing requirements. The top timing diagram shows the operation of the source neighbor and the bottom shows the destination neighbor. Under the assumption that the preferred channel #13 is interfered, the sender's timeslot will be composed of following sub-timeslots: time offset, channel idle detection, channel switch, channel idle detection, sending packet, waiting, receiving ACK frame, idle; the receiver will execute sub-timeslots as follows: time offset, waiting for data, channel switch, waiting for data, receiving packet, check and process message, sending ACK frame, idle. When scheduled as the link's destination, the device must $$T_{Next\ slot} = T_{Slot} + T_{Arrival} - \begin{cases} T_{TxOffset1} & \text{no channel switch} \\ T_{TxOffset2} & \text{channel switch} \end{cases} \quad \text{Eq. 1}$$

enter receive mode. The receive window (specified by RWTW) allows device timing to drift but still communicate and resynchronize their slot timers. Length of a time slot (specified by $T_{Slot}$) in industrial wireless network is generally fixed. Value of sending offset 1 (specified by $T_{TxOffset1}$) and Value of sending offset 2 (specified by $T_{TxOffset2}$) are also fixed, which are defined before setting up this kind of industrial wireless system. As shown in FIG. 1, the sender acts as the clock source. If the receiver detects a message, it captures the arriving time (specified by $T_{Arrival}$) of the start of first bit. The receiver can implement time synchronization with its sender according to Eq. 1. If channel switch does not happen, the $T_{TxOffset1}$ will be chosen in the time synchronization equation. If channel switch happened, the $T_{TxOffset2}$ will be chosen in the time synchronization equation. Another time synchronization method is: If the sender wants to send packet immediately stead of waiting till the end of its SWTW, it could mark and add the rest of its SWTW (specified by $T_{TxRest}$) in its packet to the receiver. The receiver could extract the $T_{TxRest}$ from the packet, and then add the $T_{TxRest}$ in the right of the Eq. 1. One of obvious advantages of this method is that cost is certainly low because value of the $T_{TxRest}$ is typically small.

Time synchronization is not only occurring in process of normal data communication, but also join process of new node.

As shown in FIG. 1, before the beginning of a communication time slot, two communication channels has been assigned for this time slot (Let it be supposed that channel #13 is the preferred channel, channel #20 channel is a the backup channel). Before data communication between the sender and receiver, the sender will detect whether preferred channel #13 is interfered or not by some methods within its SWTW. Those methods can be continuous detection or non-persistent CSMA, etc. If the channel was always busy in whole SWTW, the sender will consider this channel has been interfered. Let it be supposed that preferred channel #13 is interfered in this example, thus the sender will not send message on channel #13 and automatically execute channel switch to channel #20, and then re-detect interference on channel #20. If channel #20 is clear, the sender will converse from detecting state to sending state and ready to send data.

The receiver could not receive message from the sender within its RWTW because the sender did not send data at all on channel #13. When the RWTW times out, the receiver will consider channel #13 has been interfered, and then automatically execute channel switch to the backup channel #20 for subsequent message waiting. Because the backup channel #20 is not interfered, the receiver will receive data from the sender on this channel. After message check and process, the receiver will subsequently send ACK frame to the render. All of the above processes are completed within the allocated time slot, without having to occupy other additional time slots. Channel switching commands are self-generated and executed by the render and receiver respectively according to present communication channel state. One side of communication doesn't need to send control command to tell another side to switch channel. Therefore, the present invention achieves a real self-adaptive channel hopping on both sides of communication.

In future communication time-slots, the two sides switch back to the preferred communication channel #13 in order to use the preferred channel #13 for communications. Thus, the previous preferred communication channel #13 is also present preferred communication channel #13, and the previous backup channel #20 is also present backup channel #20. Another method is: In future communication time-slots, the two sides will no longer use the previous preferred channel #13, but preferentially use the original backup channel #20 as present preferred channel. Therefore, the previous preferred communication channel #13 becomes present backup communication channel, and the previous backup channel #20 is present preferred channel.

Figure 2:
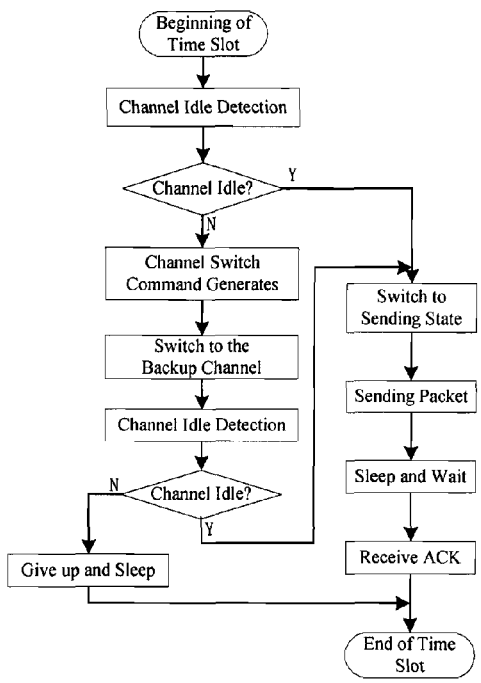
FIG. 2: Flow chart for describing sequences of the sender.

FIG. 2 is the flow chart for describing sequences of the sender. At the beginning of the time slot, the sender firstly executes channel idle detection function within its SWTW on the preferred channel #13. If there is no interference on this channel #13, the sender will immediately switch to sending preparation state from present detection state. If there is interference on this channel #13, result of executing channel idle detection function feedbacks to the sender that this channel was interfered. And then, channel switching commands are self-generated and executed by the sender. Channel idle detection will be executed in its second SWTW again on the backup channel #20. If there is still interference on this channel #20, the sender will give up sending message and switch to low power consumption state for saving power consumption. However, if there is no interference on this channel #20, the sender will immediately switch to sending preparation state for sending message. After sending message, the sender will sleep for a while in low power consumption state, and then wake up for receiving ACK frame. Sender's channel idle detection function can be implemented by many ways, such as continuous CCA or non-persistent CSMA mechanism, etc. Continuous CCA mechanism is that the sender executes continuing CCA within its SWTW. Non-persistent CSMA mechanism is that the sender executes non-continuous CCA detection by means of backoff algorithm within its SWTW. That is to say, when the sender realize the channel is busy through CSMA detection, it will turn to low-power mode from detection mode in order to reduce power consumption, and then retreat CSMA detection after waiting for a while. Finally, the sender has to give up channel idle detection if its SWTW times out.

Figure 3:
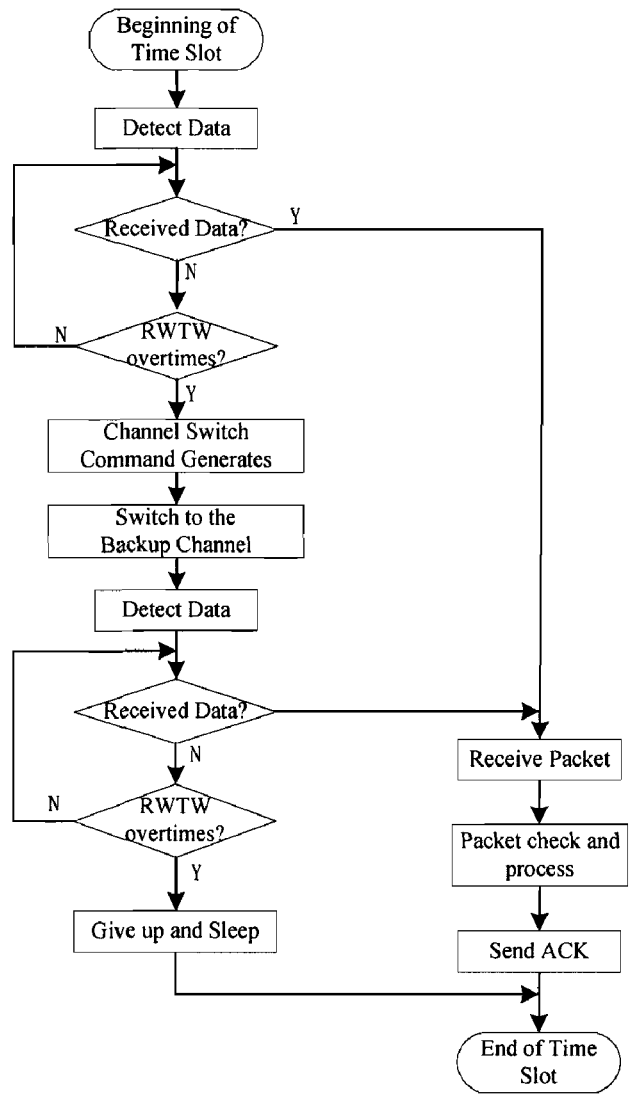
FIG. 3: Flow chart for describing sequences of the receiver.

FIG. 3 is the flow chart for describing sequences of the receiver. At the beginning of the time slot, the sender firstly detects data within its RWTW on the preferred channel #13. If there are data detected by it, the receiver will continually receive data until the end of this frame. And then, the receiver processes the frame and sends ACK frame to the sender. If there are not data detected by it on this preferred channel #13, it will continue listening till its RWTW times out. If no message is detected within its RWTW, a channel switch command will be self-generated and executed by the receiver. And then, the receiver will detect data again within its second RWTW on the backup channel #20. If there is still no message detected within its second RWTW, the receiver has to give up receiving message and turn into sleep till the end of this time slot. If there is message detected, the receiver will continually receive data until the end of this frame, and then processes the frame and send ACK frame to the sender. In addition, the receiver can also use address identification method to further improve the communication success efficiency and reduce power consumption. This method is specific as follows: If the receiver receives front part of the data frame within RWTW, it immediately extracts destination address from the received data frames, and then compares the destination address with its own address. If the destination address corresponds to its own address, the receiver will continue accepting the data frame. If the destination address does not correspond to its own address, the receiver will give up accepting data frame and then turn to low-power consumption mode or channel switch mode.

While the present invention has been described with respect to certain preferred embodiments, it will be apparent to those skilled in the art that various changes and modifications may be made without departing from the scope of the invention as defined in the following claims.

We claim:

1. An industrial wireless communication method based on Self-Adaptive Channel Hopping within Timeslot (SACHT), the method comprising:

assigning two communication channels including a preferred channel and a backup channel to each communication link within one time slot, the length of Send Waiting Time Window (SWTW) and Receive Waiting Time Window (RWTW) for communication are negotiated and defined before starting; and selecting the preferred channel as a communication channel at the beginning of a given time slot, wherein if the preferred channel is interfered, a sender does not send a message due to detecting the preferred channel interfered within the SWTW, and a receiver does not receive an expected message within the RWTW, a channel switching control command being generated and implemented respectively by the sender and the receiver, and then the sender and the receiver communicating on the backup channel.

2. The industrial wireless communication method as recited in claim 1, wherein the sender re-detect whether the backup channel is interfered or not within a second SWTW after channel switch, and the sender gives up this time slot communication if the backup channel is also interfered.

3. An industrial wireless communication method based on Self-Adaptive Channel Hopping within Timeslot (SACHT), the method comprising:

assigning more than two communication channels including a preferred channel and a backup channels to each communication link within one time slot, the length of Send Waiting Time Window (SWTW) and Receive Waiting Time Window (RWTW) for communication are negotiated and defined before starting; and selecting the preferred channel as a communication channel at the beginning of a given time slot, if the preferred channel is interfered, a sender does not send message due to detecting the preferred channel interfered within the SWTW, and the receiver does not receive expected message within the RWTW, a channel switching control command being generated and implemented by the sender and the receiver, and the sender and the receiver communicating on the backup channel, if a former backup channel is interfered, the sender and the receiver switch to a later backup channel for communication.

4. The industrial wireless communication method as recited in claim 3, further comprising:

defining and fixing the length of a time slot (specified by $T_{Slot}$), Value of sending offset 1 (specified by $T^{TxOffset}$), and Value of sending offset 2 (specified by $T^{TxOffset2}$) before starting in the industrial wireless network;

implementing time synchronization with a sender according to a time synchronization equation by a receiver, wherein if a channel switch does not happen, $T_{TxOffset1}$ is chosen in the time synchronization equation; if the channel switch happens, $T_{TxOffset2}$ will be chosen in the time synchronization equation; if the sender wants to send packet immediately stead of waiting till the end of the SWTW, the sender marks and adds the $T_{TxRest}$ in a packet to the receiver; the receiver extracts the $T_{TxRest}$ from the packet, and then adds the $T^{TxRest}$ in the right of the time synchronization equation which is $$T_{Next\ slot} = T_{Slot} + T_{Arrival} - \begin{cases} T_{TxOffset1} & \text{no channel switch} \\ T_{TxOffset2} & \text{channel switch} \end{cases}.$$

5. The industrial wireless communication method as recited in claim 4, wherein for a successful channel switch within a time slot, the sender and the receiver of communication take the previous preferred channel as the present backup channel and the previous backup channel as the present preferred channel in future communication timeslots.

* * * * *